United States Patent [19]
Shelton

[11] Patent Number: 6,023,236
[45] Date of Patent: Feb. 8, 2000

[54] SPEEDOMETER ASSISTED PATROL SPEED SEARCH FOR DSP TRAFFIC RADAR

[75] Inventor: Maurice E. Shelton, Chanute, Kans.

[73] Assignee: Kustom Signals, Inc., Lenexa, Kans.

[21] Appl. No.: 09/201,284

[22] Filed: Nov. 30, 1998

[51] Int. Cl.$^7$ ............................. G01S 13/53; G01S 13/58; G01S 13/60
[52] U.S. Cl. ......................... 342/104; 342/115; 342/114; 342/116; 342/192; 342/196
[58] Field of Search .................... 342/104, 114, 342/115, 111, 116, 192, 196

[56] References Cited

U.S. PATENT DOCUMENTS

| | | | |
|---|---|---|---|
| 4,335,382 | 6/1982 | Brown et al. | 342/104 |
| 5,381,155 | 1/1995 | Gerber | 340/93 |
| 5,525,996 | 6/1996 | Aker et al. | 342/104 |
| 5,528,245 | 6/1996 | Aker et al. | 342/104 |
| 5,528,246 | 6/1996 | Henderson et al. | 342/115 |
| 5,563,603 | 10/1996 | Aker et al. | 342/105 |
| 5,565,871 | 10/1996 | Aker et al. | 342/176 |
| 5,570,093 | 10/1996 | Aker et al. | 342/104 |
| 5,691,724 | 11/1997 | Aker et al. | 342/115 |
| 5,815,092 | 9/1998 | Gregg, III et al. | 340/902 |
| 5,912,822 | 6/1999 | Davis et al. | 340/936 |
| 5,935,190 | 8/1999 | Davis et al. | 701/119 |

FOREIGN PATENT DOCUMENTS

| | | | |
|---|---|---|---|
| 2091756T3 | 11/1996 | Spain | G01S 13/92 |

OTHER PUBLICATIONS

"Radar Speed Monitoring System", Sato, Y., Vehicle Navigation and Information Systems Conference, 1994.Proceedings., 1994, 1994, pp.: 89–93.

"Millimeter wave safety warning system for in–vehicle signing", Greneker, G., IEEE Aerospace and Electronics Systems Magazine vol.: 13 7, Jul. 1998, pp.: 7–12.

"Improving on police radar", Fisher, P.D., IEEE Spectrum vol.: 29 7, Jul. 1992, pp.: 38–43.

"Spread spectrum for commercial communications", Schilling, D.L.; Milstein, L.B.; Pickholtz, R.L.; Kullback, M.; Miller, F., IEEE Communications Magazine Vol.: 29 4, Apr. 1991, pp.: 66–79.

"35–GHz–Doppler radar for law enforcement agencies in Europe", Westphal, R.; Kessler, A., Microwave Symposium Digest, 1988., IEEE MTT–S International, 1988, pp.: 1031–1033 vol. 2.

*Primary Examiner*—John B. Sotomayor
*Attorney, Agent, or Firm*—Chase & Yakimo, L.C.

[57] ABSTRACT

A digital signal processor (DSP) traffic radar utilizing pulses from the patrol vehicle's electronic speedometer to steer the DSP's search of Doppler return information for the patrol vehicle's radar return signal, to improve target identification and minimize inaccuracies. In moving mode, when the patrol vehicle comes to a stop, no pulses are received by the DSP and therefore the patrol speed is set to zero, eliminating false association with other moving targets.

10 Claims, 5 Drawing Sheets

SPEEDOMETER ASSISTED PATROL SPEED SEARCH FOR DSP TRAFFIC RADAR

BACKGROUND OF THE INVENTION

This invention relates to improvements in traffic radar devices for law enforcement and related applications in which the speed of a target vehicle is detected from a stationary or moving transmitter location and, in particular, to a method and apparatus for processing Doppler return information by analyzing a limited area of the frequency spectrum corresponding to the speedometer output of the patrol vehicle, in conjunction with analysis of the entire frequency spectrum in order to improve target identification and minimize interference and unwanted harmonics.

In previous traffic radars utilizing digital signal processing (DSP), the patrol speed is found by using frequency and magnitude criteria, signal patterns, and patrol vehicle tracking history. Such a DSP radar is disclosed, for example, in U.S. Pat. No. 5,528,246 to Henderson et al., owned by the assignee herein. Anomalies can occur using these methods such as when the transmitting antenna is released from standby mode, when strong returns from other vehicles are received that are caused by a shadowing effect when a vehicle is traveling in the same direction as the patrol vehicle but at a different speed or when the patrol vehicle signal is summed with another vehicle moving in the opposite direction. Another problem can occur when the radar is in moving mode and the patrol vehicle comes to a stop at a traffic light. A return from moving traffic can be confused with the patrol vehicle and a wrong patrol vehicle speed is displayed resulting in an inaccurate calculation of a target speed.

SUMMARY OF THE INVENTION

It is therefore an important object of the present invention to provide a method and apparatus for determining the patrol vehicle speed through a combination of speedometer input and radar return.

Another important object of the present invention is to provide a method and apparatus for determining the patrol vehicle speed when the patrol vehicle comes to a stop while the radar unit is in moving mode.

It is also an important object of the present invention to provide a method and apparatus for determining patrol vehicle speed within a DSP search window by synchronizing the speedometer speed with the radar measured speed of the patrol vehicle.

A further important object of the present invention is to provide a method and apparatus for determining patrol vehicle speed that is more reliable.

More particularly, the signal from an electronic speedometer is input to a DSP radar. The signal processing system of the radar unit converts the pulses from the speedometer and calculates the speedometer speed. Using this speed as the center of a search window, the system searches for the patrol vehicle radar return signal that falls within the search window. Once the patrol speed is found, other targets can be found and their speed accurately determined. If the radar is in moving mode and the patrol vehicle comes to a stop, there will be no pulses from the electronic speedometer and the patrol speed will be calculated to be zero eliminating the need to search for a non-existent patrol vehicle radar return signal. If no patrol vehicle radar return signal is found within the search window, a search for the patrol vehicle radar return is conducted using methods known in the prior art. Likewise, if speedometer pulses are not detected at start-up, the search for the patrol vehicle return signal may employ prior art methods.

DETAILED DESCRIPTION

Figure 1:
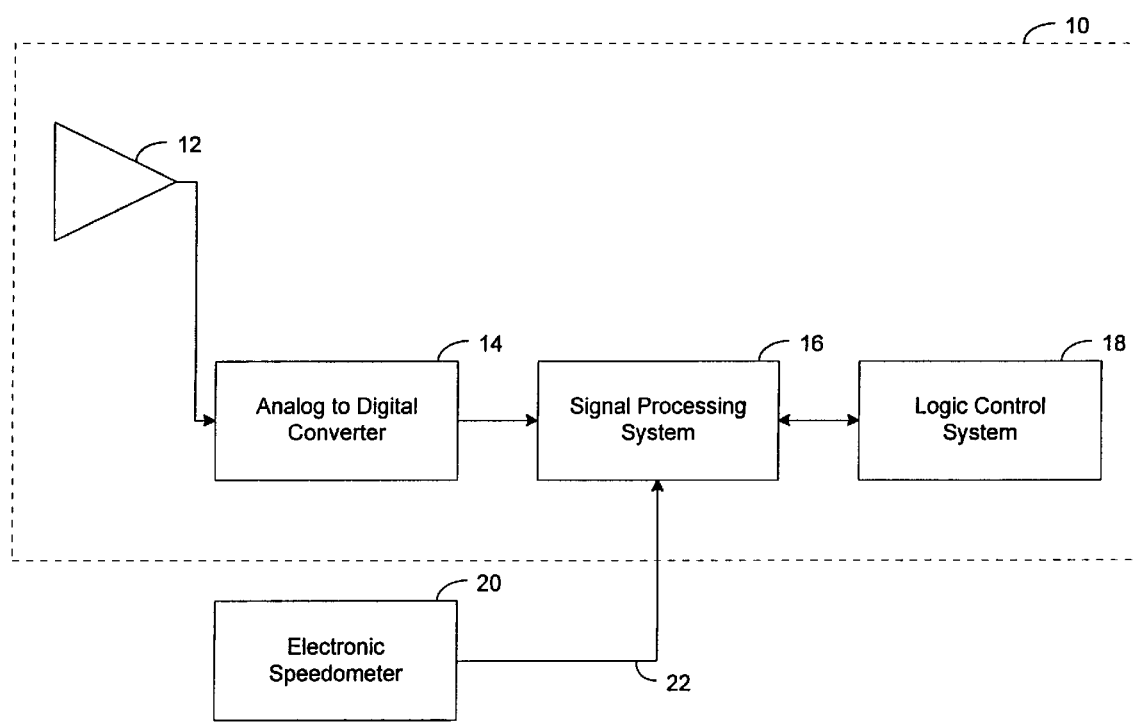
FIG. 1 is a simplified block diagram of the DSP radar unit and electronic speedometer.

Turning more particularly to the drawings, FIG. 1 illustrates a DSP radar unit 10 with an antenna 12 for sending and receiving radar signals. Radar return signals received by antenna 12 are converted from analog to digital by A to D converter 14, and input to signal processing system 16 containing a digital signal processor (DSP). It should be understood that a DSP traffic radar unit transmits a single frequency microwave signal toward moving and stationary targets. A portion of the microwave signal is reflected by the targets and is received, mixed, and amplified by the receiver section of antenna 12. The signal received is a composite of all signals reflected by the moving and stationary targets. Conversion of the signal from the time domain to the frequency domain by the DSP separates the targets by frequency, which is directly proportional to the speed of the target.

The operator interface, including mode selection and data display, is included in logic control system 18. Logic control system 18 and signal processing system 16 work in tandem to control calculation, configuration, and display of targets and patrol speed. Output 22 from a patrol car electronic speedometer 20 is connected to the DSP of signal processing system 16. As in a conventional traffic radar, a display window (not shown) is provided to display the patrol vehicle speed.

The electronic speedometer 20 outputs a certain number of pulses for each mile the patrol vehicle travels. A common value of speedometer pulses is 8,000 pulses per mile. Therefore, when the patrol vehicle is traveling at a speed of one mile per hour, the speedometer will output (8,000 pulses per mile * 1 mile per hour) pulses per hour. The number of pulses per second is found by dividing the number of pulses per mile by the number of seconds per hour. Thus, the number of pulses that occur in one second (per mile per hour) is 8,000 pulses per hour divided by 3,600 seconds per hour, which equals 2.222 pulses per second (per mile per hour). The sync time is the reciprocal of this value or 1/2.222, which equals 0.450 seconds or 450 milliseconds. The sync time is the amount of time needed to accumulate pulses, which is equal to the speed of the vehicle in miles per hour. The sync time is scaled by 15 to determine the synchronization number (450/15=30). The synchronization number is stored and used to steer the DSP patrol search. Since the DSP does not directly use the speedometer pulses as the patrol speed, small inaccuracies of the speedometer synchronization are not important. The electronic speedometer output pulses are interfaced to the DSP in signal processing system 16 by way of a level converter and a Schmitt trigger logic circuit known in the art, to an edge sensitive interrupt pin on the DSP chip (such as Analog Device ADI2185). The DSP calls an interrupt service routine that counts pulses each time a speedometer pulse is received.

Configuration and control of a traffic radar unit is typically accomplished using buttons on the front panel of the radar unit and on the remote control unit (as illustrated for example in the U.S. Pat. No. 5,528,246). Although specific buttons on the remote control unit illustrated in the '246 patent will be used to describe the operation of the present invention, their use is for example only and not a limitation of the present invention. Other buttons or controls can be used to perform the same functions.

Figure 2:
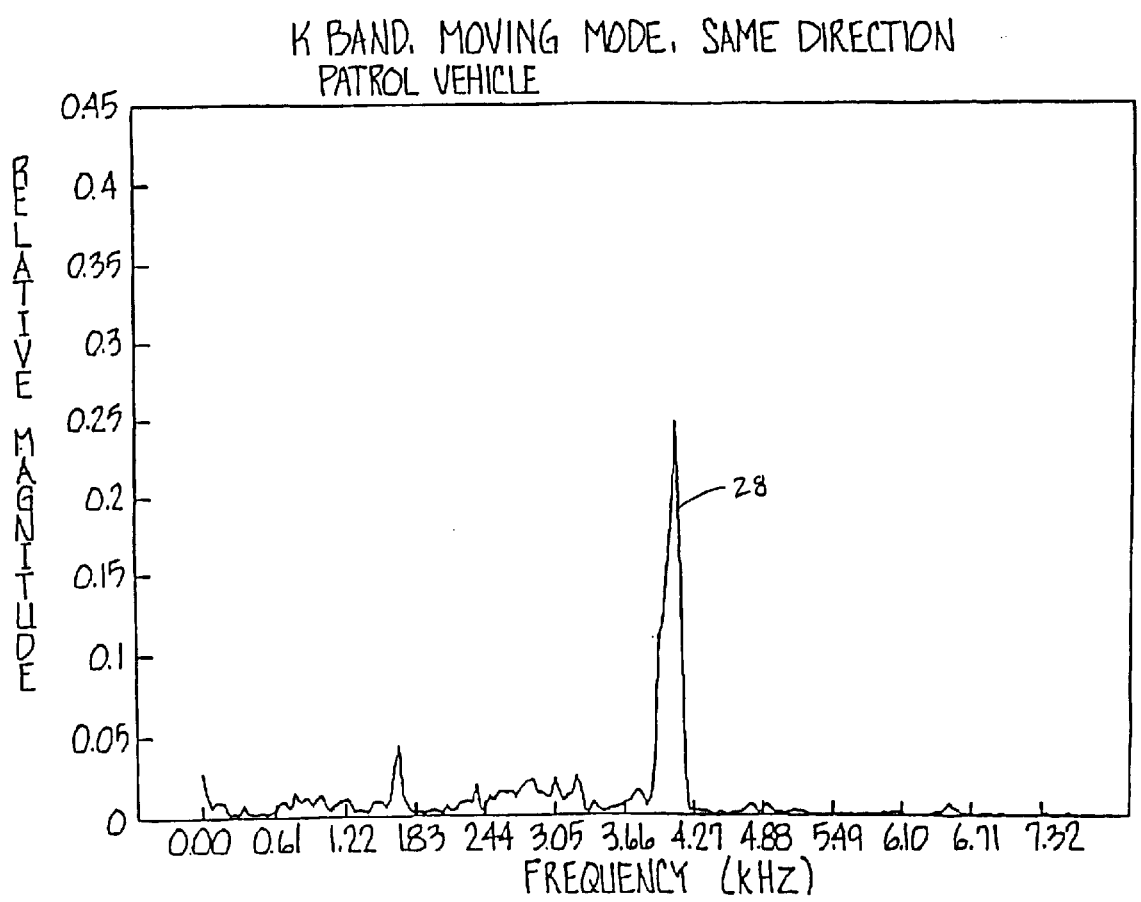
FIG. 2 illustrates a frequency spectrum with only the patrol vehicle signal present.
Figure 3:
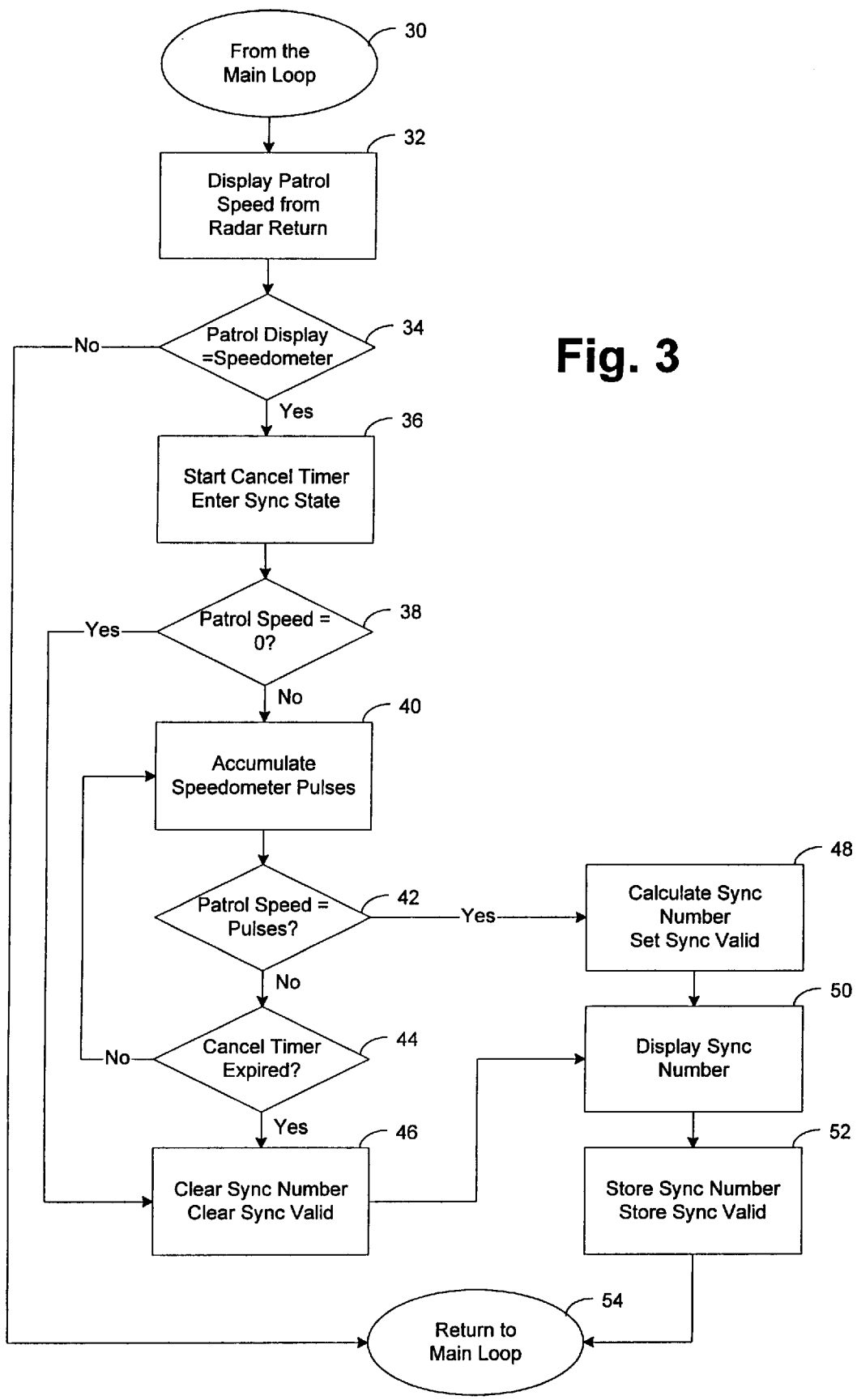
FIG. 3 comprises a flow chart of the DSP software synchronization routine.

To synchronize the speedometer input to the radar return, the operator depresses the "patrol blank" button on the remote control unit twice while driving the patrol vehicle at a constant speed. Referring to FIGS. 2 and 3, the operator requests to synchronize the speedometer input to the patrol vehicle radar return 28, which is transformed from the time domain to the frequency domain by the DSP of Signal Processing System 16. Synchronization is typically done upon initial installation of the radar unit in the patrol vehicle or when the radar unit is moved to another vehicle. From the main loop 30, the patrol speed is displayed from the radar return 32. The entire frequency spectrum is shown in FIG. 2 after translation from the time domain with only a patrol vehicle signal 28 present. If the vehicle speedometer does not match the radar displayed speed 34, the operator can cancel the synchronization by pressing any button other than the "lock" button on the remote control unit, the routine returns to the main loop 54 and the patrol speed is found using standard searching parameters.

If the patrol speed matches the vehicle speed 34, the operator depresses the "lock" button on the remote control unit and the cancel timer starts and the system enters the sync state 36. If the patrol speed is zero 38, any previous sync number and sync valid flag will be cleared 46 and the unit will display "0" as the synchronization number 50. This gives the operator a way to clear previously stored synchronization data. The sync number and cleared sync valid flag are stored 52. The routine then returns to the main loop 54 and the patrol speed is found using standard searching parameters.

If the patrol speed is not zero 38, a loop is entered where speedometer pulses are accumulated 40 until either the patrol speed equals the speedometer pulses 42 or the cancel timer has expired. If the patrol speed does not equal the speedometer pulses 42 and cancel timer has not expired 44, speedometer pulses continue to accumulate 40. If the cancel timer has expired 44, the sync number and sync valid are cleared 46 and the unit will display "0" as the synchronization number 50 and store the sync number and cleared sync valid flag 52. The routine then returns to the main loop 54 and the patrol speed is found using standard searching parameters.

If the patrol speed equals the speedometer pulses 42 before the cancel timer has expired 44, the sync number is calculated from the elapsed cancel timer and the sync valid flag is set 48. The sync number is displayed 50 and the sync number and sync valid flag are stored in non-volatile memory 52. The unit then returns to the main loop 54.

Each time radar unit 10 is turned on or a new sync valid has been set by the synchronization routine (FIG. 3), the sync number and the sync valid flag are sent to the DSP from nonvolatile memory. The DSP synchronization software is only executed upon operator command when it is necessary to synchronize the radar unit with the speedometer, or to clear previously stored parameters.

Figure 4:
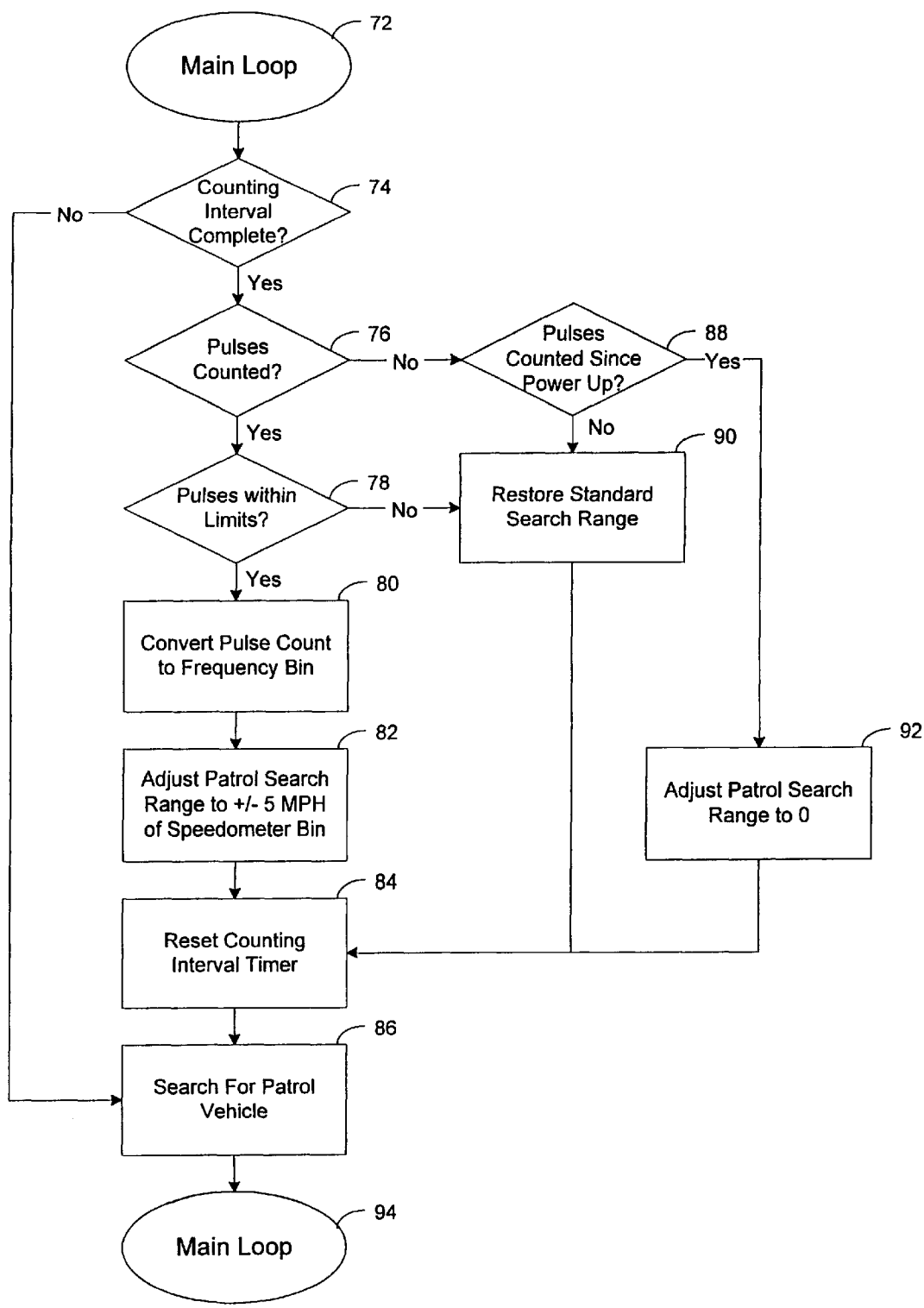
FIG. 4 comprises a flow chart of the DSP software that processes the speedometer pulses.
Figure 5:
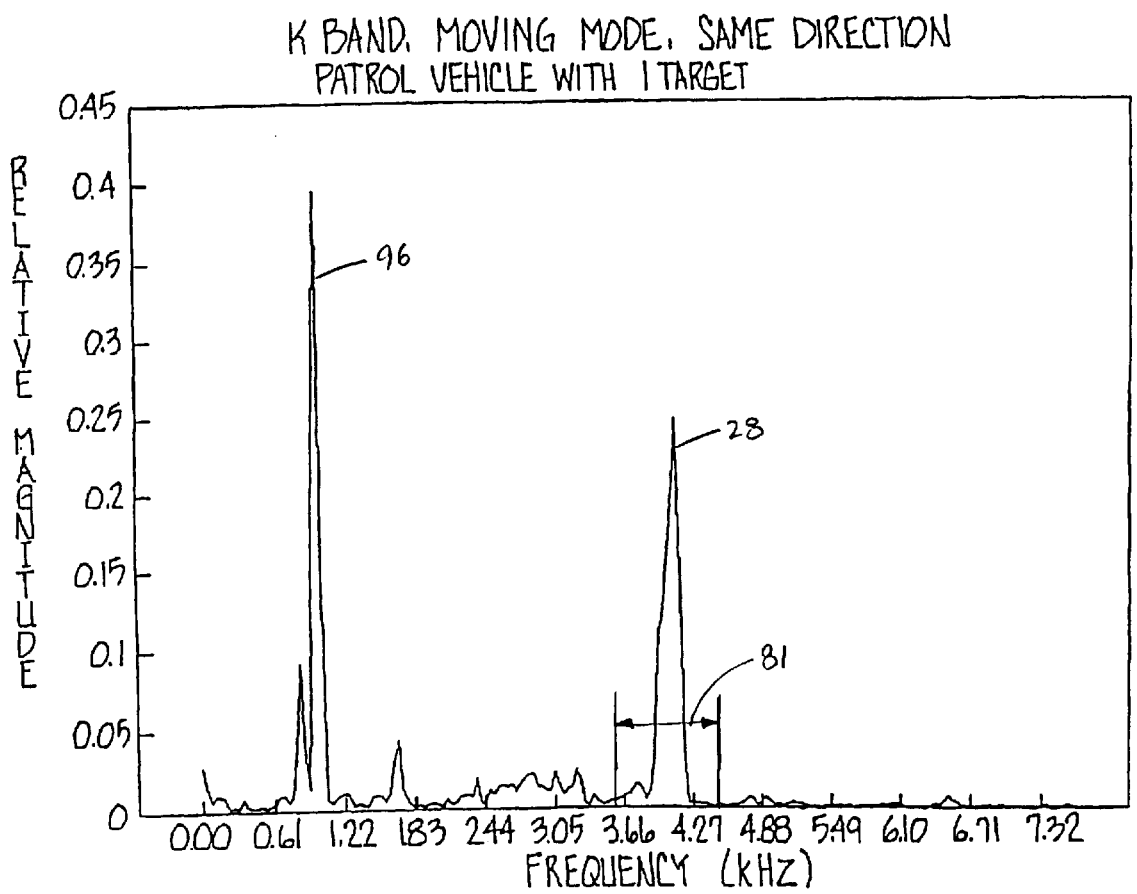
FIG. 5 illustrates a frequency spectrum showing the patrol vehicle signal, a target signal and the search window.

As illustrated in FIGS. 4 and 5, from the main loop 72 which is executing the conventional DSP software, if the speedometer input routine is called before the counting interval has completed 74, the system searches for the patrol vehicle 86 using standard searching parameters of the prior art. FIG. 5 illustrates the frequency spectrum with a patrol vehicle signal 28 and target vehicle signal 96. In this example, the patrol vehicle is moving at a higher speed and in the same direction as the target vehicle. If the counting interval has completed 74 and there were some speedometer pulses counted during the counting interval 76, and the number of pulses are within the patrol range 78, the pulse count is converted from the time domain to the equivalent bin number in the frequency domain of the Doppler spectra 80. This conversion will depend on the band of the microwave antenna 12 and whether the unit is displaying miles per hour or kilometers per hour. The patrol speed search window 81 is set to plus or minus five MPH (or KPH) of the speedometer bin 82 and the counting interval timer is reset 84. The patrol vehicle return is searched for within the search interval 86. The routine returns to the main loop 94 to search for other targets 96.

If no pulses are counted during the counting interval 76, and pulses have been counted since power up 88, the patrol speed is zero indicating that the patrol vehicle has stopped and since the search range is set to zero, the patrol vehicle speed is set to zero and the patrol vehicle search range is set to zero 92. The counting interval time is reset 84, and the patrol vehicle return is searched for within the search range 86. Since the search range is set to zero, the patrol vehicle speed is set to zero and the routine returns to the main loop 82 to search for other targets.

If no pulses are counted during the counting interval 76, and no pulses have been counted since power up 88 or if pulses have been counted during the counting interval 76 but the number of pulses counted are outside the patrol range limits 78, either of which could indicate that the speedometer is malfunctioning or a cable is broken, the default search range is restored 90. The counting interval is reset 84 and the routine searches for the patrol vehicle 86 using standard searching parameters. The routine then returns to the main routine 94 to search for other targets.

Accordingly, it may be appreciated that by limiting the search for the patrol vehicle return signal in the frequency spectrum to a window around the speedometer speed, many false returns can be eliminated. Additionally, when the patrol vehicle comes to a stop, there is no need to search for the patrol vehicle return, therefore the present invention unambiguously determines the patrol vehicle speed eliminating erroneous target speed calculation and display.

Having thus described the invention, what is claimed as new and desired to be secured by letters patent is as follows:

1. In a traffic radar, apparatus for determining patrol vehicle speed from Doppler return information comprising:

means for receiving Doppler return information containing at least one return signal derived from a stationary target, and for presenting said information as digital data, means for transforming said data into the frequency domain to provide a spectrum that includes frequency components corresponding to Doppler return signals contained in said information, a memory for storing said components, means for receiving speed information corresponding to the patrol vehicle speedometer speed, means responsive to said speed information for providing a search window around said patrol vehicle speedometer speed, said window having a lower boundary less than said patrol vehicle speedometer speed and an upper boundary greater than said patrol vehicle speedometer speed, means for searching said components stored in said memory within said window to identify the patrol vehicle component, and means responsive to said identified component for indicating the speed of said patrol vehicle corresponding thereto.

2. The apparatus as claimed in claim 1, wherein said speed information comprises an electrical signal having a frequency proportional to the speed of the patrol vehicle.

3. The apparatus as claimed in claim 2, wherein said signal includes time-spaced speedometer pulses.

4. The apparatus as claimed in claim 3, wherein said means for providing a search window includes means for counting said pulses for a specified interval, and means for relating said pulse count to a location in said frequency spectrum.

5. The apparatus as claimed in claim 4, wherein said means for searching includes searching in said window around a center defined by said location.

6. A method of determining patrol vehicle speed from Doppler return information in a traffic radar carried by said patrol vehicle, said method comprising the steps of:

(a) receiving Doppler return information containing at least one return signal derived from a stationary target, (b) presenting said Doppler return information as digital data, (c) transforming said data into the frequency domain to provide a spectrum that includes frequency components corresponding to Doppler return signals contained in said information, (d) storing said components in memory, (e) receiving patrol vehicle speed information from a patrol vehicle speedometer, (f) providing a search window in said spectrum around said speedometer speed, (g) searching said components in said memory within said window to identify the component corresponding to the Doppler return of the patrol vehicle, and (h) indicating the speed of said patrol vehicle corresponding to said identified component.

7. The method as claimed in claim 6, wherein said step (f) includes counting time-spaced pulses comprising said patrol vehicle speed information to determine if the pulse count is within a patrol vehicle speed range, and converting said pulse count to the corresponding frequency in the frequency domain.

8. The method as claimed in claim 6, wherein said step (f) includes locating said speedometer speed at the center of the search window.

9. The method as claimed in claim 8, wherein said step (g) includes searching beginning at a first boundary of said search window and concluding at a second boundary of said search window.

10. The method as claimed in claim 6, wherein said step (f) includes determining if said patrol vehicle speed is zero and adjusting said search window to preclude searching for the patrol vehicle component.

\* \* \* \* \*